United States Patent
Livezey

[15] 3,680,675
[45] Aug. 1, 1972

[54] FRICTION PLATE AND MATING MEMBER

[72] Inventor: William G. Livezey, Indianapolis, Ind.

[73] Assignee: General Motors Corporation, Detroit, Mich.

[22] Filed: Nov. 9, 1970

[21] Appl. No.: 88,066

[52] U.S. Cl..................192/107 R, 192/70.2, 64/9, 74/462, 188/218 XL
[51] Int. Cl..............................................F16d 13/60
[58] Field of Search............192/70.2, 107 R; 64/9 R; 188/218 XL; 74/462

[56] References Cited

UNITED STATES PATENTS

| | | | |
|---|---|---|---|
| 3,209,611 | 10/1965 | Iyoi | 74/462 |
| 3,476,228 | 11/1969 | Pritchard | 192/107 R |
| 3,256,967 | 6/1966 | Heid | 192/107 R |

Primary Examiner—William F. O'Dea
Assistant Examiner—Randall Heald
Attorney—W. E. Finken, A. M. Heiter and R. L. Phillips

[57] ABSTRACT

A friction plate member having teeth provided with a pressure angle different from that of the teeth of a mating member.

4 Claims, 3 Drawing Figures

PATENTED AUG 1 1972

3,680,675

INVENTOR.
William G. Livezey
BY
Ronald L. Phillips
ATTORNEY

FRICTION PLATE AND MATING MEMBER

This invention relates to a friction plate and mating member and more particularly to the pressure angles of the teeth of a friction plate and mating member.

The invention is illustrated in a clutch subassembly having a clutch plate with internal involute teeth mating with the external involute teeth of a rotary hub. The clutch plate teeth have a pressure angle larger than that of the rotary hub teeth to prevent tip loading of the plate teeth and thereby lessen the probability of plate breakage.

An object of the present invention is to provide a new and improved combination of friction plate and mating member.

Another object is to provide connection between a friction plate member and a torque transmitting member by mating teeth having different pressure angles.

Another object is to provide tooth shapes on a friction plate member and a torque transmitting member that prevent tip loading of the plate teeth.

These and other objects of the invention will become more apparent from the following description and drawing in which.

Figure 1:
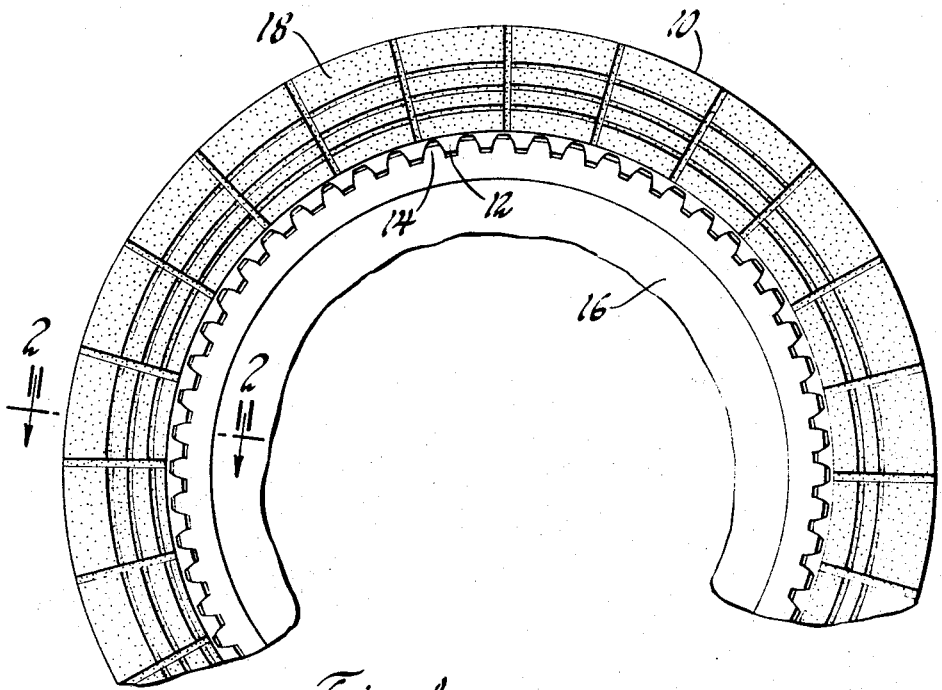
FIG. 1 is a partial view of a clutch subassembly having tooth structure according to the present invention.
Figure 2:
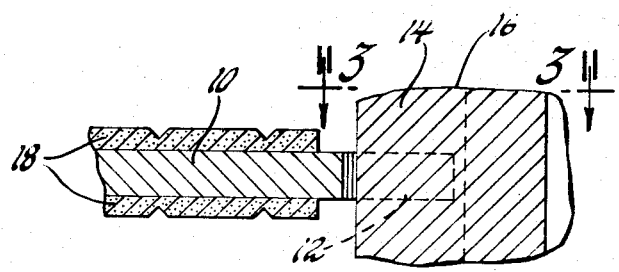
FIG. 2 is an enlarged view taken on the line 2—2 in FIG. 1.

Referring to FIGS. 1 and 2, the invention is illustrated in a clutch subassembly comprising an annular metal clutch plate or member 10 having internal circumferentially spaced involute teeth 12 engaging or mating with external circumferentially spaced involute teeth 14 of a metal rotary hub 16. Friction discs 18 of suitable material are bonded to the opposite sides of plate 10 to provide the desired frictional characteristics on contact with sandwiching friction plates (not shown) of the complete clutch assembly. The toothed clutch plate is piloted on the teeth 14 which are elongated in the axial direction to permit sufficient axial movement of the clutch plate for the engagement.

Figure 3:
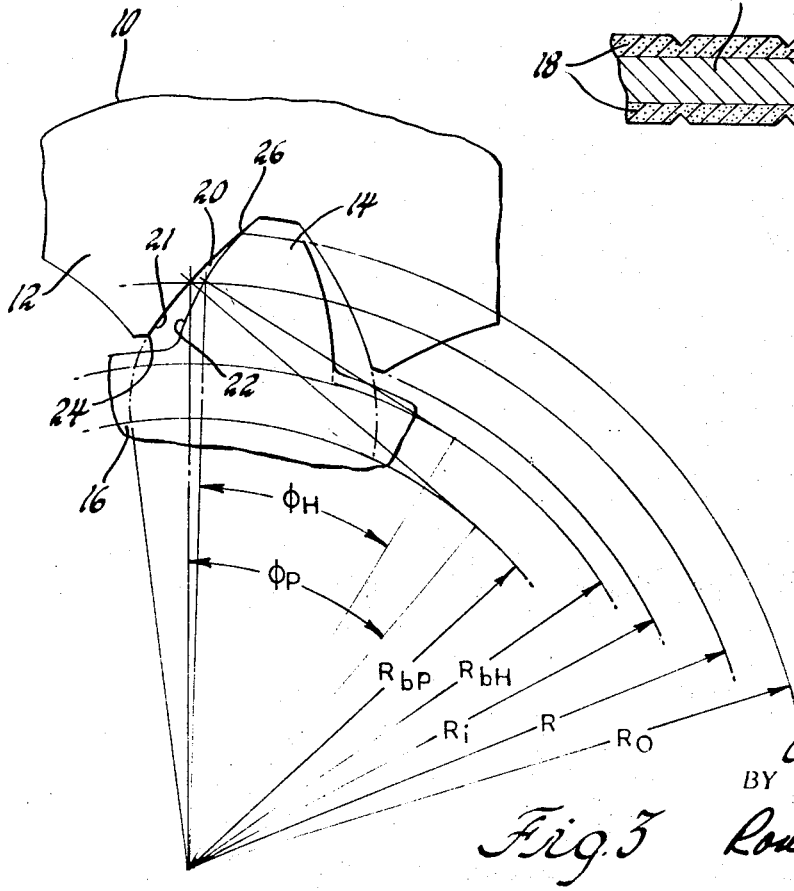
FIG. 3 is a view taken on the line 3—3 in FIG. 2.

As best shown in FIG. 3, the hub teeth 14 have an involute shape developed from a base circle whose radius is indicated as $R_{bH}$. The clutch plate teeth 12 also have an involute shape which is developed from a base circle whose radius is smaller than that of the hub teeth 14 and is indicated as $R_{bP}$; that is, $R_{bP}$ is less than $R_{bH}$. The minor radius of the plate teeth 12 is indicated as $R_i$ and the major radius of these teeth is indicated as $R_o$. Both the plate teeth 12 and hub teeth 14 have the same pitch circle whose radius is indicated as R and since the base radius $R_{bP}$ of the plate teeth 12 is less than the base radius $R_{bH}$ of the hub teeth 14, the pressure angle $\phi_P$ of the plate teeth 12 is larger than the pressure angle $\phi_H$ of the hub teeth 14.

Since the plate teeth 12 have a larger pressure angle than the hub teeth 14, there is effected a divergence 20 between the involute sides 21 and 22 of the mating teeth 12 and 14, respectively, this divergence being exaggerated in FIG. 3 to clearly illustrate this feature. By providing the divergence 20, the tip 24 on the engagement side of each plate tooth 12 is prevented from contacting the dedendum portion of the side 22 of each hub tooth 14 and instead, initial contact occurs between the tip 26 of each hub tooth 14 and the dedendum portion of the side 21 of each plate tooth 12. Thus tip loading of the plate teeth is prevented and as a result, the probability of plate breakage is lessened. Furthermore, the divergence 20 is made sufficiently small so that normal tooth wear will provide custom fitting of the profiles of the mating teeth thereby minimizing the effect of tooth spacing errors with more teeth coming into contact until the tooth bearing areas approach proportions such that wear ceases.

To illustrate the extent of the exaggeration of the divergence 20 and also to provide an example of an actual structure constructed according to the present invention, the objective of preventing clutch plate tip loading while providing automatic custom fitting of the profiles of the teeth will be met by providing the hub teeth 14 with a 30° pressure angle and the clutch plate teeth 12 with a 31° pressure angle. It will be appreciated that this substantial difference in pressure angles may be effected by providing the hub teeth with a standard pressure angle and increasing the pressure angle of the plate teeth over standard and also by having the pressure angle of clutch plate teeth remain standard and decreasing the pressure angle of the hub teeth below standard. Furthermore, both the clutch plate teeth and the hub teeth may have nonstandard pressure angles to provide the divergence. It will be further understood that while the invention has been illustrated for use in a clutch assembly, the invention is also applicable to brake assemblies wherein braking operation is effected instead of clutching operation.

The above described embodiment is illustrative of the invention which may be modified within the scope of the appended claims.

I claim:

1. In combination, a friction plate member having circumferentially spaced teeth, a torque transmitting member having circumferentially spaced teeth mating with the teeth on said friction plate member, the teeth of each member having a tip portion and a dedendum portion, and the teeth on one of said members having a pressure angle substantially different from that of the teeth on the other of said members so that the tip portions of the teeth of said one member are prevented from coming into contact with the dedendum portions of the teeth of the other member while the dedendum portions of the teeth of said one member are permitted to continuously contact the tip portions of the teeth of the other member.

2. In combination, a friction plate member, a torque transmitting member, circumferentially spaced teeth having a geometric form on said torque transmitting member, circumferentially spaced teeth on said friction plate member mating with and having the same geometric form as the teeth on said torque transmitting member, the teeth of each member having a tip portion and a dedendum portion, and the teeth on said friction plate member having a pressure angle substantially larger than that of the teeth on said torque transmitting member so that the tip portions of the teeth of the friction plate member are prevented from coming into contact with and being loaded by the dedendum portions to continuously contact teeth of the torque transmitting member while the dedendum portions of the teeth of said friction plate member are permitted to continuously contact the tip portions of the teeth of the torque transmitting member.

3. In combination, a friction plate member having circumferentially spaced involute teeth, a rotary member having circumferentially spaced involute teeth mating with the teeth on said friction plate member, the teeth of each member having a tip portion and a dedendum portion, and the teeth on said friction plate member having a pressure angle substantially larger than that of the teeth on said rotary member so that the tip portions of the teeth of the friction plate member are prevented from coming into contact with the dedendum portions of the teeth of the rotary member while the dedendum portions of the teeth of the friction plate member are permitted to continuously contact the tip portions of the teeth of the rotary member.

4. In combination, a friction plate member having internal circumferentially spaced involute teeth, a rotary member having external circumferentially spaced involute teeth for continuously mating with the teeth on said friction plate member, the teeth of each member having a tip portion and a dedendum portion, and the teeth on said friction plate member having a pressure angle substantially larger than that of the teeth on said rotary member so that the tip portions of the teeth of the friction plate member are prevented from contacting the dedendum portions of the teeth of the rotary member while the dedendum portions of the teeth of said friction plate member are permitted to contact the tip portions of the teeth of said rotary member.

* * * * *

PO-1050
(5/69)

UNITED STATES PATENT OFFICE
CERTIFICATE OF CORRECTION

Patent No. __3,680,675__    Dated __August 1, 1972__

Inventor(s) __William G. Livezey__

It is certified that error appears in the above-identified patent and that said Letters Patent are hereby corrected as shown below:

Column 2, Line 62, "to continuously contact" should read -- of the --.
Column 4, Line 12, insert -- continuously -- after "to" and before "contact".

Signed and sealed this 2nd day of January 1973.

(SEAL)
Attest:

EDWARD M. FLETCHER, JR.           ROBERT GOTTSCHALK
Attesting Officer                 Commissioner of Patents